(12) United States Patent
Hung et al.

(10) Patent No.: US 11,286,968 B1
(45) Date of Patent: Mar. 29, 2022

(54) ANCHORING DEVICE

(71) Applicant: YOKE INDUSTRIAL CORP., Taichung (TW)

(72) Inventors: Wei-Chieh Hung, Taichung (TW); Chia-Hsien Wang, Shengang Township (TW); Chi-Min Liu, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 17/217,674

(22) Filed: Mar. 30, 2021

(51) Int. Cl.
*F16B 2/12* (2006.01)
*F16L 3/24* (2006.01)
*F16B 7/04* (2006.01)

(52) U.S. Cl.
CPC .............. *F16B 2/12* (2013.01); *F16B 7/0493* (2013.01); *F16L 3/24* (2013.01)

(58) Field of Classification Search
CPC .............. F16B 2/12; F16B 7/0493; F16L 3/24
See application file for complete search history.

(56) References Cited

U.S. PATENT DOCUMENTS

| | | | | |
|---|---|---|---|---|
| 6,962,234 B1* | 11/2005 | Reeves | ............... | E04G 21/3261 182/36 |
| 7,000,730 B1* | 2/2006 | Ostrobrod | ............... | A62B 1/04 182/36 |
| 7,111,707 B2* | 9/2006 | Reeves | ............... | E04G 21/3276 182/36 |
| 9,216,307 B2* | 12/2015 | Liu | ............... | E04G 21/3276 |
| 9,611,664 B2* | 4/2017 | Tsaousis | ............. | E04G 21/3242 |
| 2007/0163834 A1 | 7/2007 | Casebolt | | |
| 2016/0356050 A1* | 12/2016 | Tsaousis | ................ | E04G 5/045 |

FOREIGN PATENT DOCUMENTS

| TW | M479958 U | 6/2014 |
|---|---|---|
| TW | M612763 U | 6/2021 |

OTHER PUBLICATIONS

Search Report for TW110103794, dated Jul. 19, 2012, Total of 1 page.
English abstract for TWM479958, Total of 1 page.
English abstract for TWM612763, Total of 1 page.

* cited by examiner

*Primary Examiner* — Anita M King
(74) *Attorney, Agent, or Firm* — Tracy M Heims; Apex Juris, pllc.

(57) ABSTRACT

An anchoring device includes a track bar, a restricting member, and a locking device, wherein the track bar has a receiving groove. The restricting member is put into the receiving groove through open ends of the receiving groove. A width between a section of walls of the receiving groove and a width of a portion of the restricting member is greater than a width of a mouth of the receiving groove. The locking device includes a main body wherein a locking portion is disposed on the main body and is manipulatable to move between a first position and a second position. The main body slidably fits around the track bar. When the locking portion in the second position, the main body could slide to fit a flange of a fixture. After that, returns the locking portion back to the first position to fix the main body on the track bar.

10 Claims, 8 Drawing Sheets

ANCHORING DEVICE

BACKGROUND OF THE INVENTION

Technical Field

The present invention relates generally to a construction auxiliary device, and more particularly to an anchoring device for connecting a safety belt and a steel beam.

Description of Related Art

During the construction process, H-beams are used for building a frame of a building at first, and then the floor and grout is constructed. Generally, the worker who works at elevated levels in a construction site usually is equipped with a safety rope, a fall arrest device, or another safety device as a security precaution. An end of the safety device is connected to a fixture, and another end of the safety device is connected to the worker, thereby assuring the safety of the worker.

Each of the H-beams has a pair of two flanges, wherein the two flanges are symmetrical and opposite to each other. However, the volumes of the H-beams are huge, so that the H-beams are hard to be engaged with the safety device. Therefore, an anchoring device is usually used to connect the H-beam and the safety device. So far, the US patent No. 2007/0163834 A1 discloses a slidable beam anchor including an elongate member and two engaging members, wherein the two engaging members could slide along the elongate member to clip opposite two flanges of the H-beam. Then, a locking portion of the engaging members could lock onto the notch of the track bar, so that the anchoring device could be firmly engaged onto the H-beam. The worker could connect the safety device to a ring portion of the slidable beam anchor to fix the safety device.

However, a position of the notches of the track bar is fixed and is not adjustable. Since the width of the two flanges of the conventional H-beam are not unified, so that different track bars are needed for fitting different sizes of H-beams, causing the cost of manufacturing the anchoring device cannot be reduced. Resulting drawbacks of such conventional anchors are high cost of manufacturing and maintaining sizeable stockpiles of the anchoring device in the warehouse. Therefore, there persists room for improvement of conventional anchoring devices.

BRIEF SUMMARY OF THE INVENTION

In view of the above, the primary objective of the present invention is to provide an anchoring device, which could effectively reduce manufacturing cost and could be capable of reassembly to fit the applicable requisites of a particular anchoring device.

The present invention provides an anchoring device including a track bar, at least one restricting member, and at least one locking device. The track bar having at least one receiving groove, wherein at least one end of each of the at least one receiving groove is open. A width between a section of two walls of each of the at least one receiving groove is greater than a width of a mouth of each of the at least one receiving groove. The at least one restricting member is adapted to be put into the at least one receiving groove through the at least one open end of each of the at least one receiving groove, wherein a portion of the at least one restricting member has a width that is greater than the width of the mouth of the at least one receiving groove, so that the at least one restricting member is unable to drop from the at least one receiving groove through the mouth; the at least one restricting member has at least one protrusion which faces toward the mouth of the at least one receiving groove. The at least one locking device includes a main body and a locking member which is disposed on the main body, wherein the main body has a fitting portion that is adapted to fit around the track bar to allow the main body to be slidable back and forth along the track bar. The main body further includes a recess that could be fit onto one of the two flanges of the fixture. The at least one locking member has a locking portion, wherein the locking portion is manipulatable to move between a first position and a second position. When the locking portion is located at the first position, and the main body is pushed to slide along the track bar, the locking portion hits the at least one protrusion. When the locking portion is located at the second position, and the main body is pushed to move along the track bar, the locking portion does not hit the at least one protrusion Since the anchoring device of the present application is designed modularly, the manufacturer could only manufacture the track bar in a single size, and put different numbers of the restricting members or put the restricting members with different numbers of the protrusions into the receiving grooves of the track bar to allow the position of the protrusions of the anchoring device to be adjustable. In this way, the main body could slide along the track bar to make the locking portion resist the protrusions at different positions, so that the anchoring device could fit the H-beams in different sizes. With such design, the cost of manufacturing and the storage cost could be reduced. On the other hand, the user could buy the different restricting members to assembly with the track bar in a single size to satisfy various required demands. In this way, the user does not need to buy different sizes of anchoring devices for fitting different kinds of H-beams.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Referring to FIG. 1 to FIG. 8, an anchoring device 100 of an embodiment of the present invention is adapted to be mounted on a fixture 200, wherein the fixture 200 has a pair of two flanges 201 which are opposite and symmetrical to each other. The fixture 200 could be, but not limited to, an H-beam. The anchoring device 100 could connect the fixture 200 and objects, wherein the objects could be a fall arrest device or a safety rope.

Figure 4:
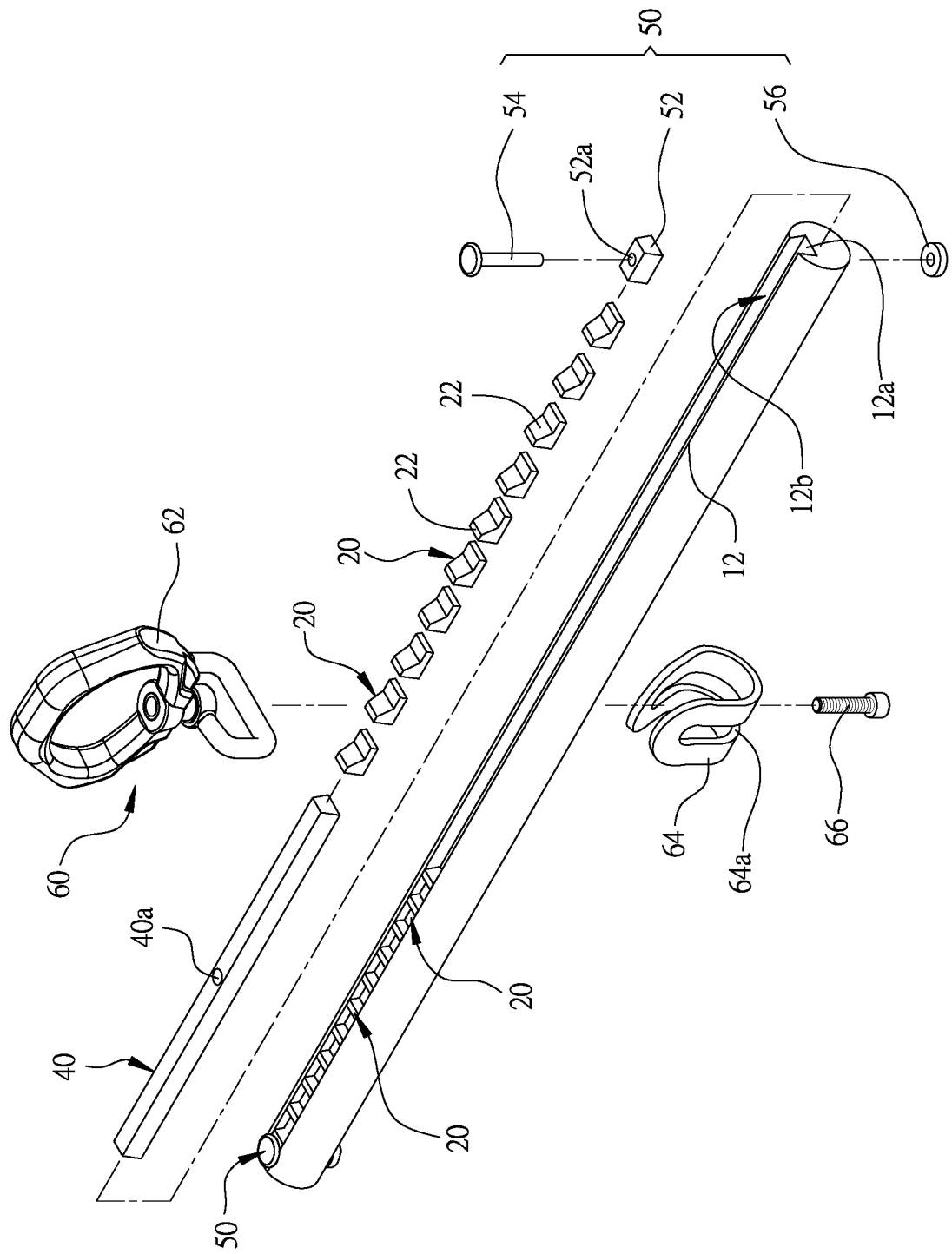
FIG. 4 is an exploded view of the anchoring device of the embodiment.
Figure 7:
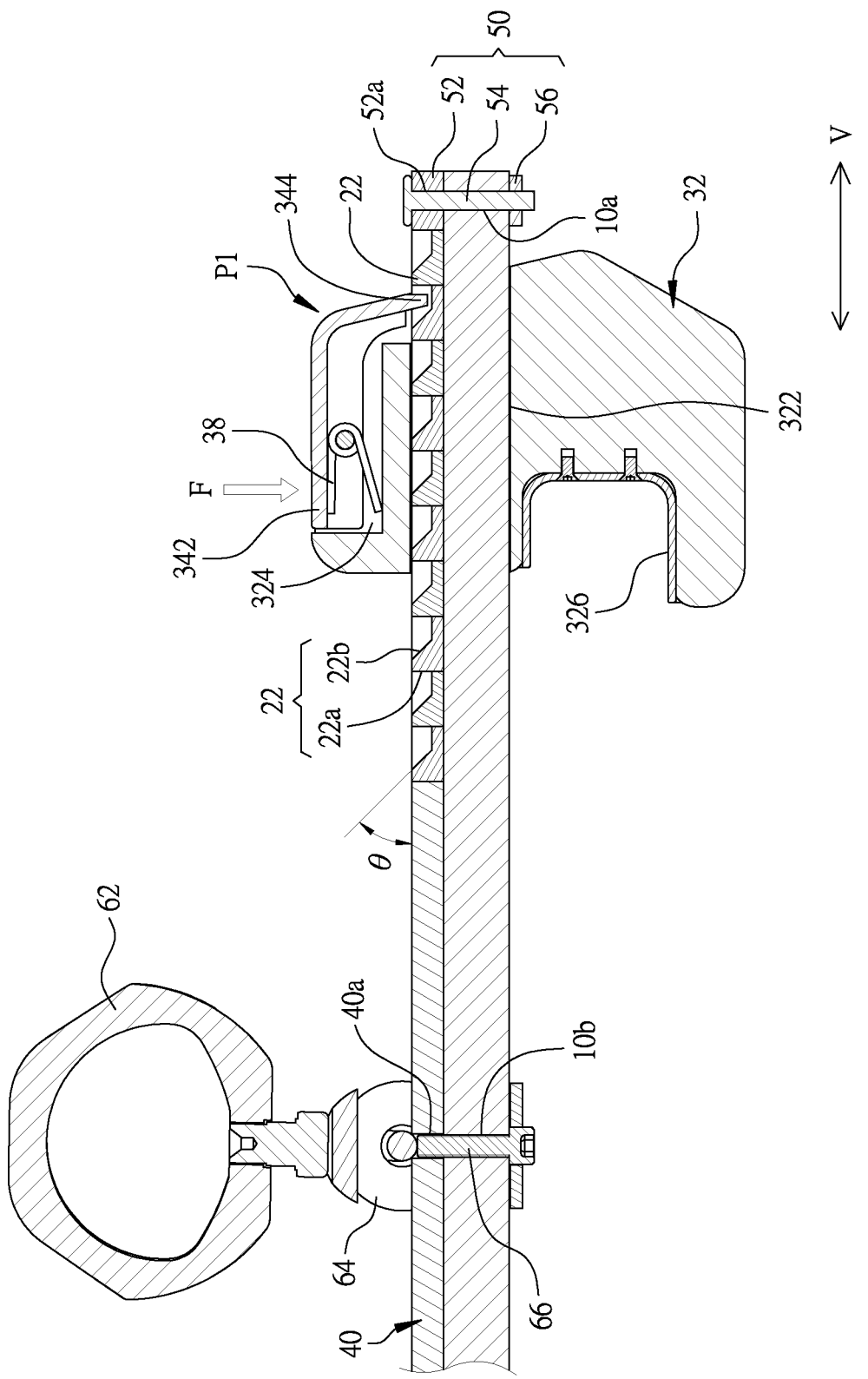
FIG. 7 is a sectional view taken along the 7-7 line in FIG. 3, showing the locking portion of the locking member is located at the first position; and, FIG. 8 is similar to FIG. 7, showing the locking portion of the locking member is located at the second position.

The anchoring device 100 includes a track bar 10, at least one restricting member 20, and at least one locking device 30, wherein the track bar 10 has a receiving groove 12 which is a through groove. In other words, the receiving groove 12 passes through the track bar 10, and two ends 12a of the receiving groove 12 are open. As illustrated in FIG. 4 and FIG. 7, the at least one restricting member 20 includes a plurality of restricting members 20, wherein each of the plurality of restricting members 20 has a protrusion 22 which has an upright wall 22a and a slanted wall 22b. The upright wall 22a is substantially perpendicular to an extending direction V of the receiving groove 12, and a tilt angle θ is formed between the slanted wall 22b and the extending direction V. In the current embodiment, the protrusion 22 is a tooth 22. The restricting members 20 could be put into the receiving groove 12 through one of the two ends 12a of the receiving groove 12. When the restricting members 20 are located in the receiving groove 12, the teeth 22 of the restricting members 20 are arranged with an equal distance therebetween and face toward a mouth 12b of the receiving groove 12, wherein the slanted wall 22b of each of the teeth 22 face toward a closer one of the two ends 12a of the receiving groove 12. More specifically, the restricting members 20 which are disengaged from the receiving groove 12 as illustrated in FIG. 4 are located at a right side of the restricting member 20, so that said restricting members 20 disengaged from the receiving groove 12 are closer to the end 12a of the right side, and thus the slanted walls 22b of the teeth 22 of the restricting members 20 located at the right side face the end 12a at the right side. On the other hands, since the restricting members 20 located at a left side of the receiving groove 12 is closer to the ends 12a of the left side, the slanted walls 22b of the teeth 22 of the restricting members 20 located at the left side face the end 12a at the left side.

It is worthy to mention that the anchoring device 100 in the current embodiment further includes a positioning rod 40 and two fixing assemblies 50, wherein the positioning rod 40 is put into the receiving groove 12 through one of the two ends 12a and is located between a part of the restricting members 20 and another part of the restricting members 20. More specifically, the positioning rod 40 could be fixed to a middle of the track bar 10, wherein a number of the part of the restricting members 20 is equal to a number of the another part of the restricting members 20. Each of the two fixing assemblies 50 has a fixing block 52, a screw 54, and a nut 56, wherein the fixing block 52 is inserted into the receiving groove 12 through one of the two ends 12a. Each of the two fixing assemblies 50 is disposed at one of the open ends of the receiving groove 12. The screw 54 passes through a perforation 52a of the fixing block 52 and a perforation 10a of the track bar 10 to screw into the nut 56, so that the two fixing blocks 52 of the two fixing assemblies 50 prevent the restricting members 20 from leaving the receiving groove 12 through any one of the two ends 12a.

Figure 6:
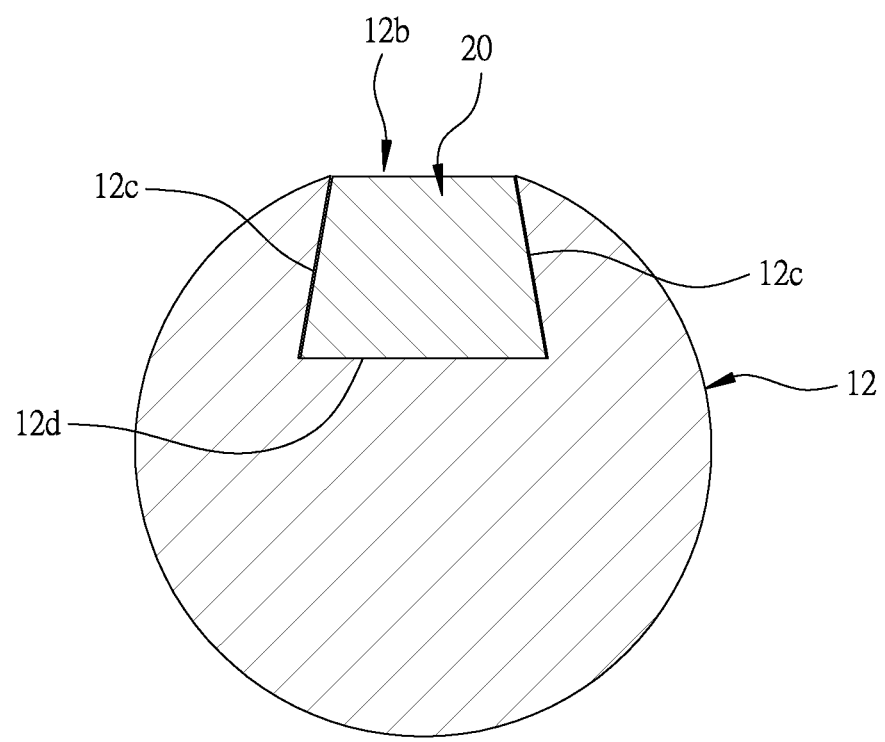
FIG. 6 is a sectional view taken along the 6-6 line in FIG. 3.

The restricting members 20 are restrained between the positioning rod 40 and the fixing blocks 52 of the two fixing assemblies 50, so that the restricting members 20 are unable to slide along the receiving groove 12. Additionally, in order to prevent the restricting members 20 from rotating in the receiving groove 12, a width of the mouth 12b of the receiving groove 12 is smaller than a width between the walls 12c of the receiving groove 12, as illustrated in FIG. 6. More specifically, the two walls 12c of the receiving groove 12 tilt outwardly in the direction from the mouth 12b to the bottom 12d of the receiving groove 12, thereby forming a dovetail groove. However, a shape of the receiving groove 12 includes, but not limited to, the dovetail, cross, circular arc, or inverted-T, as long as a width between a section of the two walls 12c of the receiving groove 12 is greater than the width of a mouth 12b of the receiving groove 12. A portion of each of the restricting members 20 has a width which is greater than the width of the mouth 12b of the receiving groove 12, wherein the width of the restricting members 20 is a distance between two sidewalls of the restricting members 20 that correspond to the two walls 12c of the receiving groove 12, so that the restricting members 20 is unable to drop from the receiving groove 12 through the mouth 12b. In the current embodiment, the two sidewalls of the restricting members 20 complementarily corresponds to the two walls 12c of the receiving groove 12.

Although the positioning rod 40 and the two fixing blocks 52 of the current embodiment are fixed to the track bar 10, to improve a stability of the structure, a width of a portion of the positioning rod 40 and a width of a portion of the fixing blocks 52 is greater than the width of the mouth 12b of the receiving groove 12. A contour of the positioning rod 40 and a contour of each of the fixing blocks 52 complementarily correspond to the shape of the receiving groove, wherein the contour of the positioning rod 40 and the contour of each of the fixing blocks 52 especially indicate the surfaces of the positioning rod 40 and the surfaces of the fixing blocks 52 that correspond to the walls 12c and the bottom 12d of the receiving groove 12. However, in practice, either the contour of each of the fixing blocks or the contour of the positioning rod could not complementarily correspond to the shape of the receiving groove. In practice, the contour of each of the fixing blocks and the contour of the positioning rod could not complementarily correspond to the shape of the receiving groove Additionally, in practice, the two restricting members which are located at the two ends of the receiving groove, namely the left-most restricting member and the right-most restricting member, could be fixed onto the track bar. With such design, not only the restricting member could be prevented from falling away from the receiving groove through the mouth of the receiving groove, but also the two fixing assemblies could be omitted to reduce cost.

Figure 5:
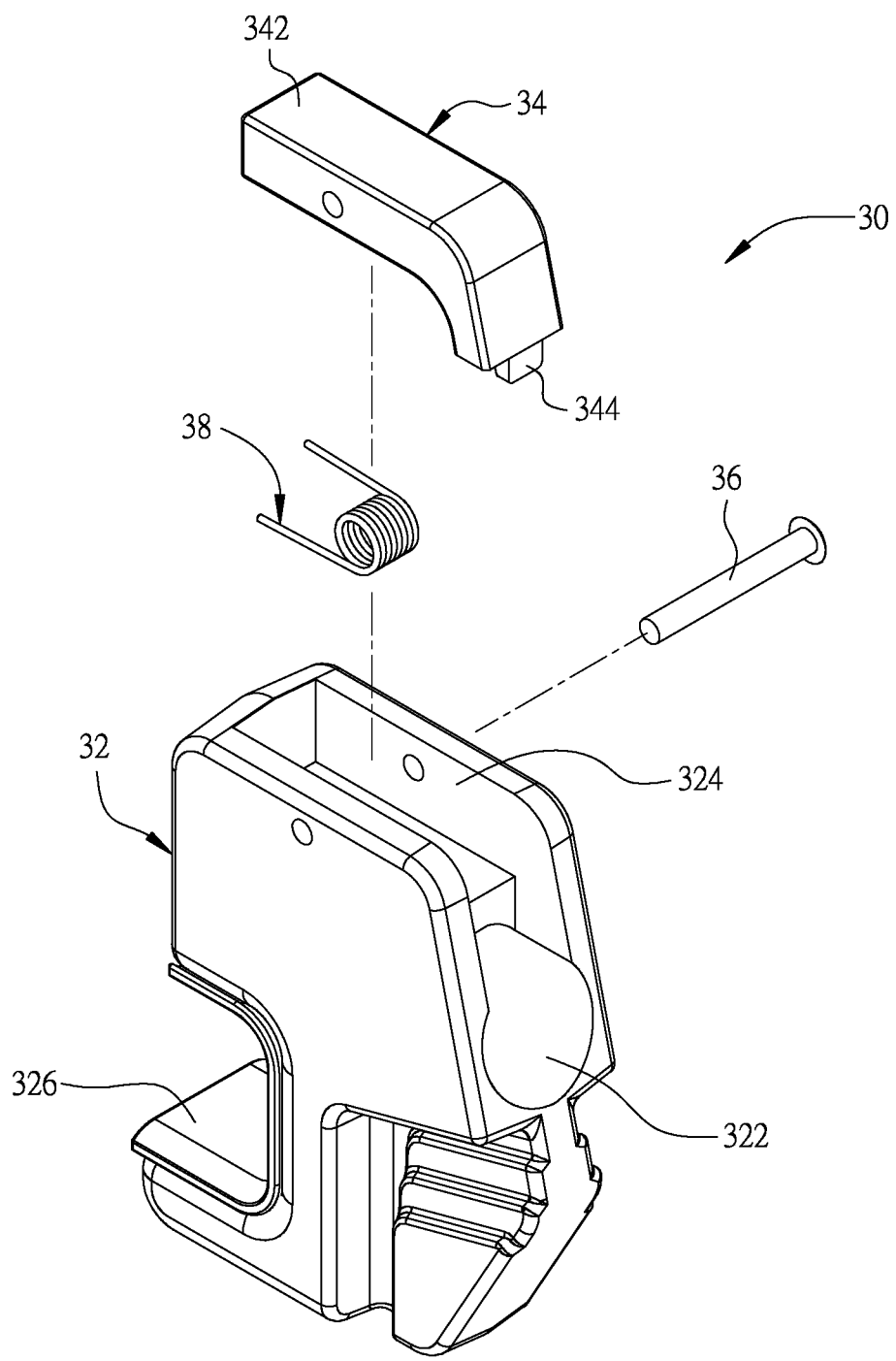
FIG. 5 is an exploded view of the locking device of the embodiment.

As illustrated in FIG. 5, the at least one locking device 30 includes two locking devices 30, each of the locking device 30 has a main body 32, a locking member 34, a pin 36, and a spring 38, wherein the main body 32 has a fitting portion 322, a slot 324, and a recess 326. The fitting portion 322 is a hole and is adapted to fit around the track bar 10, so that the main body 32 could slide along the track bar 10. The fitting portion 322 communicates with the slot 324. A direction from a bottom of the recess 326 toward an opening of the recess 326 is parallel to a centerline of the fitting portion 322. When the main body 32 slides along the track bar 10, the recess 326 could further fit onto one of the flanges 201 of the fixture 200.

The locking member 34 of the locking device 30 is located between two sidewalls of the slot 324, wherein the pin 36 passes through the two sidewalls of the slot 324 and the locking member 34 to make the locking member 34 be pivotally connected to the main body 32. A side of the locking member 34 forms a pressing portion 342, and another side of the locking member 34 which is opposite to the side relative to an pivotal portion of the locking member 34, wherein the locking portion 344 could correspond to one of the teeth 22 through a communicating site between the slot 324 and the fitting portion 322. An end of the spring 38 is connected to the pressing portion 342, and another end of the spring 38 is connected to a bottom of the slot 324.

Figure 8:
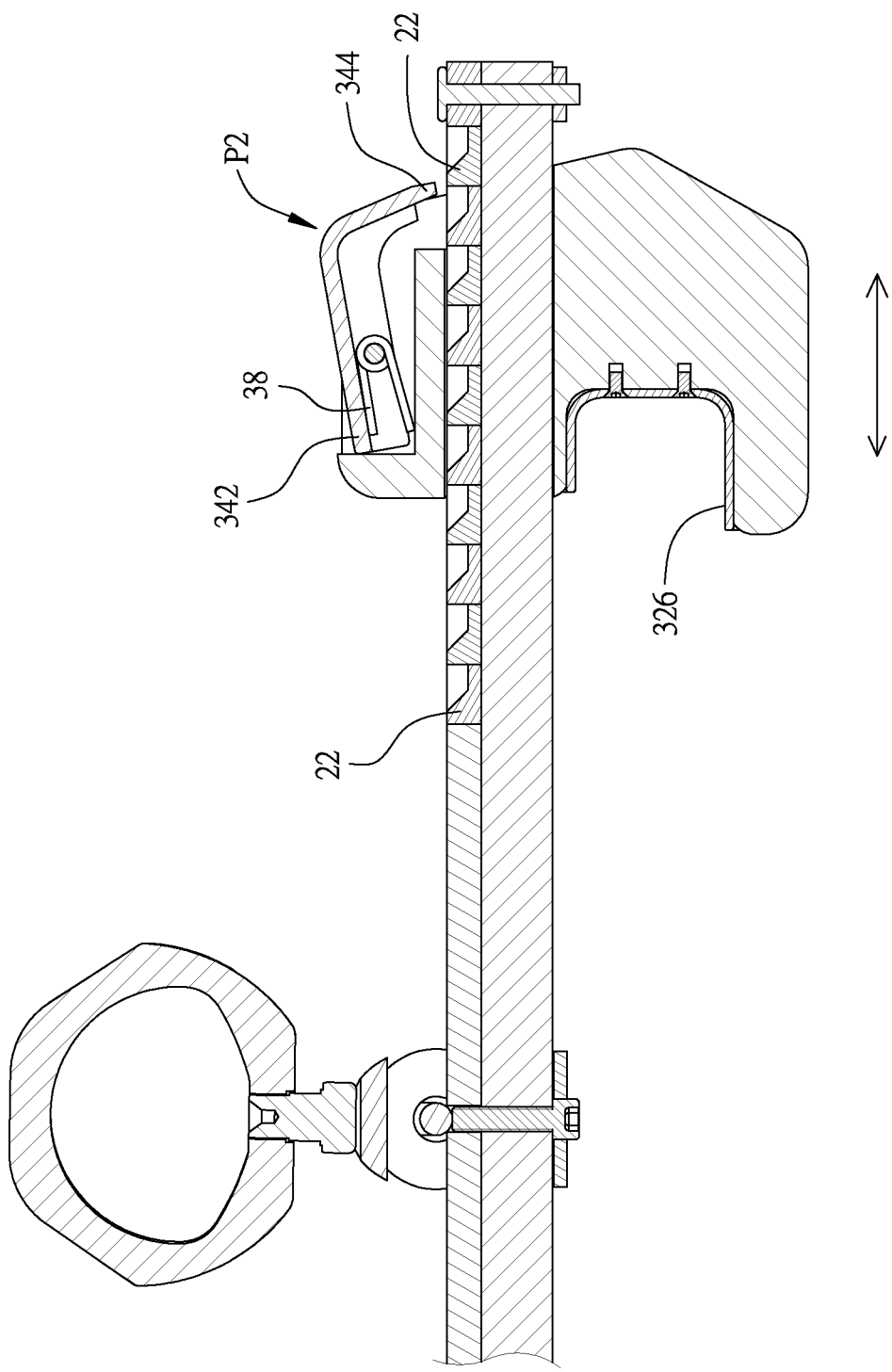

As illustrated in FIG. 7 and FIG. 8, the locking member 34 could be manipulated to make the locking portion 344 be moved between a first position P1 and a second position P2, wherein when the locking portion 344 is located at the first position P1, and the main body 32 is pushed by a user to move along the track bar 10, the locking portion 344 hits the teeth 22 of the restricting members 20. When the locking portion 344 is located at the second position P2, and the main body 32 is pushed to move along the track bar 10, the locking portion 344 does not hit the teeth 22.

More specifically, as illustrated in FIG. 7, when the locking portion 344 is located at the first position P1, and the main body 32 is pushed by a force (not shown) in a direction toward the middle of the track bar 10, the locking portion 344 hits the teeth 22 to be moved from the first position P1 to the second position P2 along the slanted wall 22b of the teeth 22. In this way, the main body 32 could be moved along the track bar 10. When the locking portion 344 is located at the first position P1, and the main body 32 is pushed by a force (not shown) in a direction away from the middle of the track bar 10, the locking portion 344 hits and is resisted by the upright wall 22a of the tooth 22 adjacent to the locking portion 344, so that the main body 32 is unable to move along the track bar 10. With such design, simply exerting a force in the direction toward the middle of the track bar 10 to the main body 32, the recess 326 of each of the locking devices 30 could move to fit onto one of the flanges 201 of the fixture 200, without pressing the pressing portion 342 of the locking member 34 by the user, thereby enhancing the convenience of use. On contrary, when a force in the direction away from the middle of the track bar 10 is exerted to the main body 32, the locking device 30 could not be moved, so that the recess 326 is not possible to be disengaged from the flange 201 of the fixture 200, thereby enhancing the safety.

As illustrated in FIG. 7 and FIG. 8, when an external force F in a direction toward the main body 32 is exerted to the pressing portion 342 of the locking member 34, the locking portion 344 of the locking member 34 is moved from the first position P1 to the second position P2. In this way, the main body 32 could be slid along the track bar 10. At the same time, the spring 38 is compressed between the pressing portion 342 and the bottom of the slot 324, so that an elastic force (not shown) provided by the spring 38, which is compressed, is exerted to the pressing portion 342. When the external force F which is exerted to the pressing portion 342 is released, the elastic force provided by the spring 38 could make the locking portion 344 return from the second position P2 to the first position P1, so that the locking portion 344 could be located between adjacent two of the teeth 22. In this way, the user could press the pressing portion 342 of the locking member 34 by the external force F to make the recess 326 of the main body 32 either fit onto one of the flanges 201 of the fixture 200 or disengage from the fixture 200.

However, in practice, the slanted wall 22b of the protrusion 22 could be replaced with another upright wall. In this way, only when the user pressed the pressing portion of the locking member, the main body could slide along the track bar.

Figure 1:
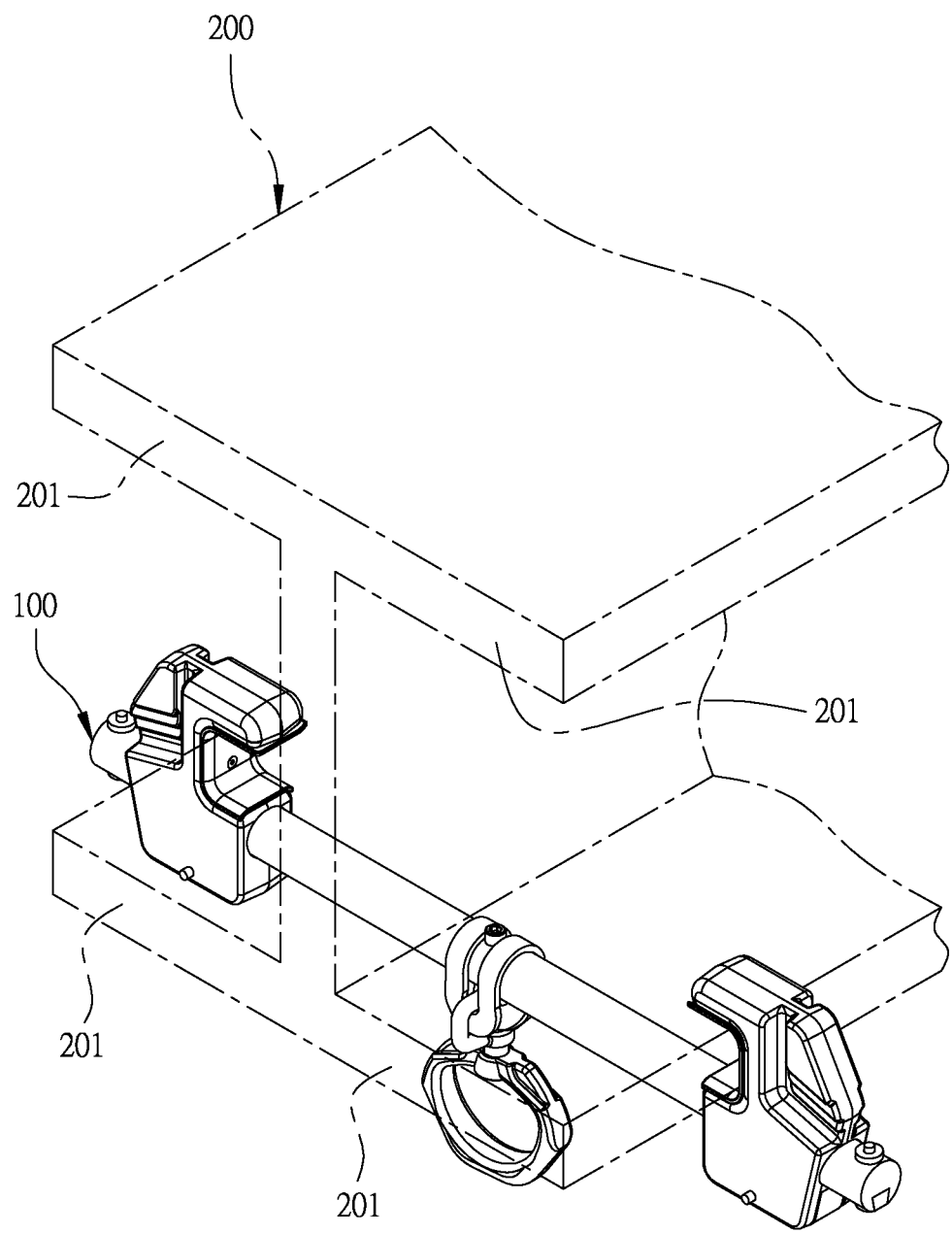
FIG. 1 is a schematic diagram of the anchoring device of an embodiment according to the present invention, showing the usage of the anchoring device.
Figure 2:
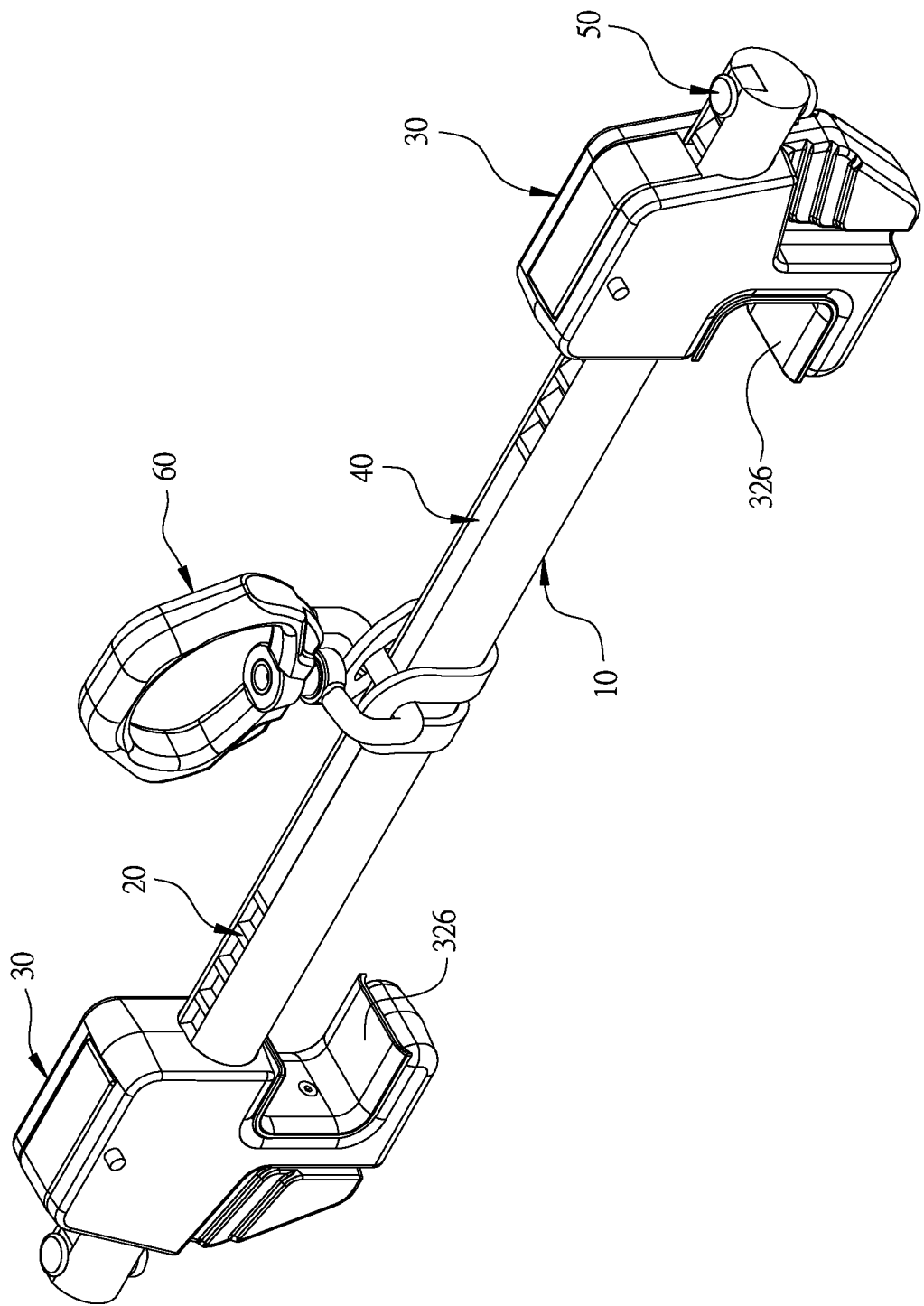
FIG. 2 is a perspective view of the anchoring device of the embodiment according to the present invention.
Figure 3:
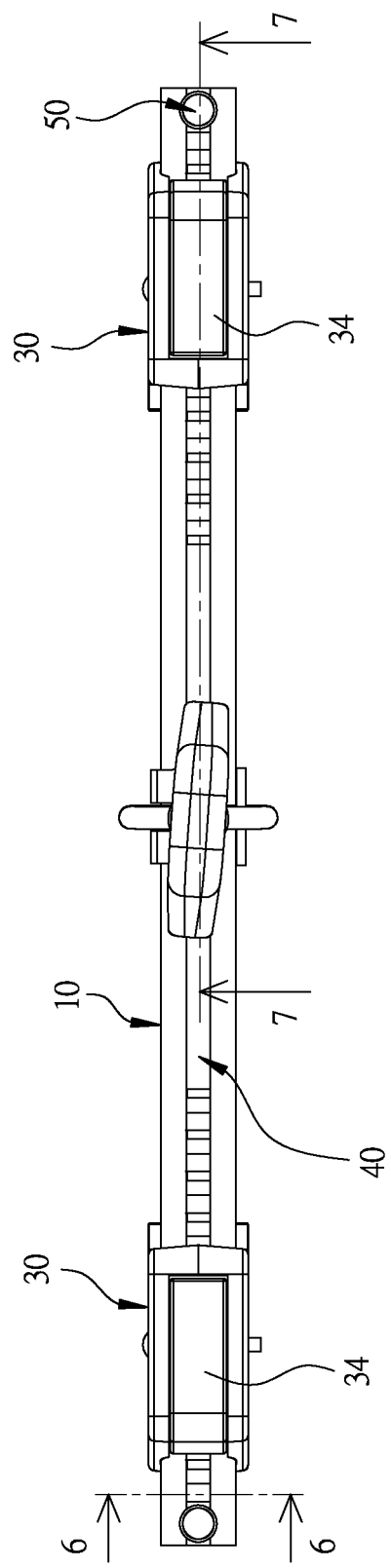
FIG. 3 is a top view of the anchoring device shown in FIG. 2.

As illustrated in FIG. 1 and FIG. 2, the two recesses 326 of the two locking devices 30 face to each other. By the moving way described above, the two recesses 326 could respectively fit onto opposite and symmetrical two of the flanges 201, so that the locking devices 30 could be firmly engaged with the fixture 200. However, in practice, the anchoring device of the present invention could only include one locking device, wherein an integrated clamp is disposed to the track bar of the anchoring device. By moving the locking device along the track bar until the clamp and the recess of the locking device are respectively fits onto the two of the flanges of the fixture.

Furthermore, the anchoring device 100 includes a ring 60 having a ring body 62, a connecting member 64, and a screw 66, wherein an opening 64a of the connecting member 64 is passed through by the ring body 62, and the screw 66 passes through the opening 64a of the connecting member 64 and a perforation 10b of the track bar 10 to screw into a threaded hole 40a of the positioning rod 40, so that the positioning rod 40 and the ring body 62 could be fixed to the track bar 10 by the screw 66. The ring 66 is adapted to be connected with a safety rope or a fall arrest device. However, in other embodiments, the safety rope or the fall arrest device could be connected to the track bar in another way, such as, but not limited to, by hanging, inserting, or directly tying to the track bar.

In view of the above, the anchoring device 100 of the embodiment is designed modularly, so that by manufacturing the track bar which is single-sized and the plurality of restricting members with one protrusion, the anchoring device 100 could fit for any H-beam in different sizes.

Additionally, the present invention provides a track bar and restricting members of another embodiment, wherein the track bar could have two receiving grooves which are cut from two ends of the track bar in a direction toward the middle of the track bar, so that each of the two receiving grooves has an end which is open and does not communicate with each other. With such design, the track bar does not need to be disposed with a positioning rod in the receiving groove, because the track bar itself has a structure equivalent to the positioning rod. The present invention provides a track bar of another embodiment, wherein the track bar has one receiving groove which is cut from an end of the track bar in a direction toward the other end of the track bar. However, only one of the two ends of the receiving groove is open. With such design, the track bar only needs a fixing assembly to be disposed at the opened end of the receiving groove. The track bars of the aforementioned embodiments could reduce the cost of manufacture.

Additionally, in another embodiment of the present invention, the at least one restricting member includes a single restricting member having a plurality of protrusions. The restricting member is suitable for being used in the track bar without the positioning rod or the structure equivalent to the positioning rod. In other embodiments of the present invention, the at least one restricting member includes a plurality of restricting members, wherein the plurality of restricting members includes a first restricting member, a second restricting member, and a third restricting member. A length of the first restricting member, a length of the second restricting member, and a length of the third restricting member are different. Each of the first restricting member, the second restricting member, and the third restricting member has a different number of the protrusion. For example, the first restricting member has a single protrusion, the second restricting member has three protrusions, and the third restricting member has four protrusions. With such design, the user could assembly different restricting members depending on the required demand.

To sum up, the present invention provides the anchoring device that is designed modular, so that the manufacturer only needs to manufacture the track bar in a single size, the restricting members with a different number of protrusions, and the single-sized restricting members with one protrusion, and the user only needs to assembly different number of the restricting members and/or the restricting number with a different number of protrusions into the receiving groove of the track bar, to allow the anchoring device to fit for the H-beam in any size. Therefore, to the manufacturer, modularity could reduce the manufacturing cost and the storing cost. To the user, by reassembling restricting members in a different length or having different protrusions with the same track bar, the anchoring device could fulfill different required demands.

It must be pointed out that the embodiment described above is only a preferred embodiment of the present invention. All equivalent structures which employ the concepts disclosed in this specification and the appended claims should fall within the scope of the present invention.

What is claimed is:

1. An anchoring device adapted to be mounted on a fixture, which has two flanges which are opposite and symmetrical to each other, for being connected to an object, wherein the anchoring device comprises:
   a track bar having at least one receiving groove, wherein at least one end of each of the at least one receiving groove is open, and a width between a section of two walls of each of the at least one receiving groove is greater than a width of a mouth of each of the at least one receiving groove;
   at least one restricting member adapted to be put into the at least one receiving groove through the at least one open end of each of the at least one receiving groove, wherein a portion of the at least one restricting member has a width which is greater than the width of the mouth of the at least one receiving groove, so that the at least one restricting member is unable to drop from the at least one receiving groove through the mouth; the at least one restricting member has at least one protrusion which faces toward the mouth of the at least one receiving groove;
   at least one locking device comprising a main body and a locking member which is disposed on the main body, wherein the main body has a fitting portion that is adapted to fit around the track bar to allow the main body to be slidable back and forth along the track bar; the main body further comprises a recess which is able to fit onto one of the two flanges of the fixture; the at least one locking member has a locking portion, wherein the locking portion is manipulatable to move between a first position and a second position; when the locking portion is located at the first position, and the main body is pushed to slide along the track bar, the locking portion hits the at least one protrusion; when the locking portion is located at the second position, and the main body is pushed to move along the track bar, the locking portion does not hit the at least one protrusion.

2. The anchoring device as claimed in claim 1, wherein the at least one receiving groove comprises a receiving groove; the receiving groove forms two ends that are open respectively at two ends of the track bar.

3. The anchoring device as claimed in claim 2, wherein the at least one restricting member comprises a plurality of restricting members, and the at least one protrusion of each of the plurality of restricting members has an upright wall and a slanted wall; the upright wall is substantially perpendicular to an extending direction of the receiving groove, and a tilt angle is formed between the slanted wall and the extending direction; when each of the plurality of restricting members is put into the receiving groove through one of the two open ends of the receiving groove, the slanted wall face toward a closer one of the two ends of the receiving groove.

4. The anchoring device as claimed in claim 3, wherein when the locking portion is located at the first position, and the main body is pushed by a force in a direction toward a middle of the track bar, the locking portion hits the at least one protrusion to be moved between the first position and the second position along the slanted wall of the at least one protrusion, so that the main body is slid along the track bar.

5. The anchoring device as claimed in claim 3, wherein when the locking portion is located at the first position, and the main body is pushed by a force in a direction away from the middle of the track bar, the locking portion hits and is resisted by the upright wall of the at least one protrusion, so that the main body is unable to slide along the track bar.

6. The anchoring device as claimed in claim 3, further comprises two fixing assemblies, wherein each of the two fixing assemblies has a fixing block, a screw, and a nut, and the fixing block is inserted into the receiving groove through one of the two open ends of the receiving groove, and the screw passes through a perforation of the fixing block and a perforation of the track bar to screw into the nut, so that the plurality of restricting members is prevented from leaving the receiving groove.

7. The anchoring device as claimed in claim 6, further comprises a positioning rod that is put into the receiving groove through one of the two open ends of the receiving groove, wherein the positioning rod is located between a part of the restricting members and another part of the restricting members.

8. The anchoring device as claimed in claim 1, wherein the at least one receiving groove is at least one dovetail groove, and two sidewalls of the at least one restricting member complimentarily corresponds to the walls of the receiving groove.

9. The anchoring device as claimed in claim 6, wherein the receiving groove is a dovetail groove, and both of a contour of each of the plurality of restricting members and a contour of each of the fixing blocks complimentarily correspond to the receiving groove.

10. The anchoring device as claimed in claim 7, wherein the receiving groove is a dovetail groove, and a contour of each of the restricting members, a contour of each of the fixing blocks, and a contour of the positioning rod complimentarily correspond to the receiving groove.

* * * * *